Aug. 6, 1968

J. D. CONTI 3,395,652

STICK INSERTING MECHANISM

Filed Aug. 21, 1967

INVENTOR
JOHN D. CONTI

BY

ATTORNEYS

INVENTOR
JOHN D. CONTI
BY
ATTORNEYS

Aug. 6, 1968

J. D. CONTI 3,395,652

STICK INSERTING MECHANISM

Filed Aug. 21, 1967

INVENTOR
JOHN D. CONTI

BY *Bessa Smith & Haly*

ATTORNEYS

Aug. 6, 1968

J. D. CONTI 3,395,652

STICK INSERTING MECHANISM

Filed Aug. 21, 1967

INVENTOR
JOHN D. CONTI

BY
Busser Smith + Hardy

ATTORNEYS

United States Patent Office 3,395,652
Patented Aug. 6, 1968

3,395,652
STICK INSERTING MECHANISM
John D. Conti, Wyncote, Pa., assignor to Shelly Bros.,
Inc., Lansdale, Pa., a corporation of Pennsylvania
Filed Aug. 21, 1967, Ser. No. 661,945
4 Claims. (Cl. 107—8)

ABSTRACT OF THE DISCLOSURE

Substantially horizontal sticks are taken from a reservoir and inserted into a rotatable stick holding means which is then rotated to place the stick in a vertical position. The stick is then advanced from the stick holding means into the mold while the stick holding means is being advanced at the same rate as the mold.

BACKGROUND OF THE INVENTION

Figures 1, 2:
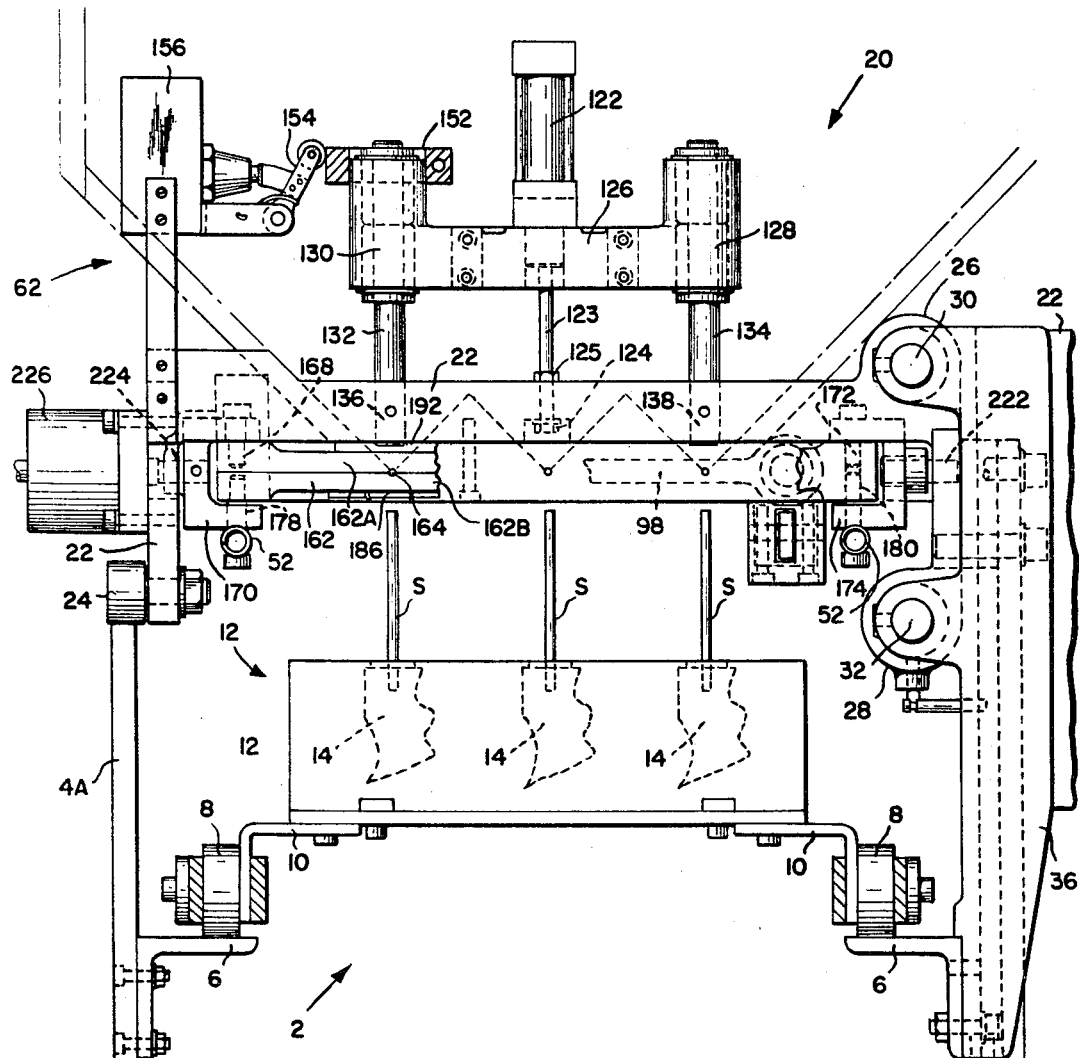

Stick inserting mechanisms for inserting sticks, for example, into candy in a mold are old in the art as shown, for example, in Patent 3,221,673. The difficulty with all heretofore known stick inserting mechanisms is that a percentage of sticks become jammed or broken. This invention greatly reduces the number of sticks which become jammed or broken.

SUMMARY OF THE INVENTION

A frame is mounted for reciprocation along the line of movement of the mold and carries a rotatable stick holding means having one or more openings for the reception of sticks depending upon the number of molds arranged abreast. One or more sticks in a substantially horizontal position are engaged by transfer means and transferred to stick holding means. There is provided means to advance the sticks in the openings in the stick holding means into the candy in the mold after stick holding means have been rotated to place the sticks in a vertical position.

Figure 3:
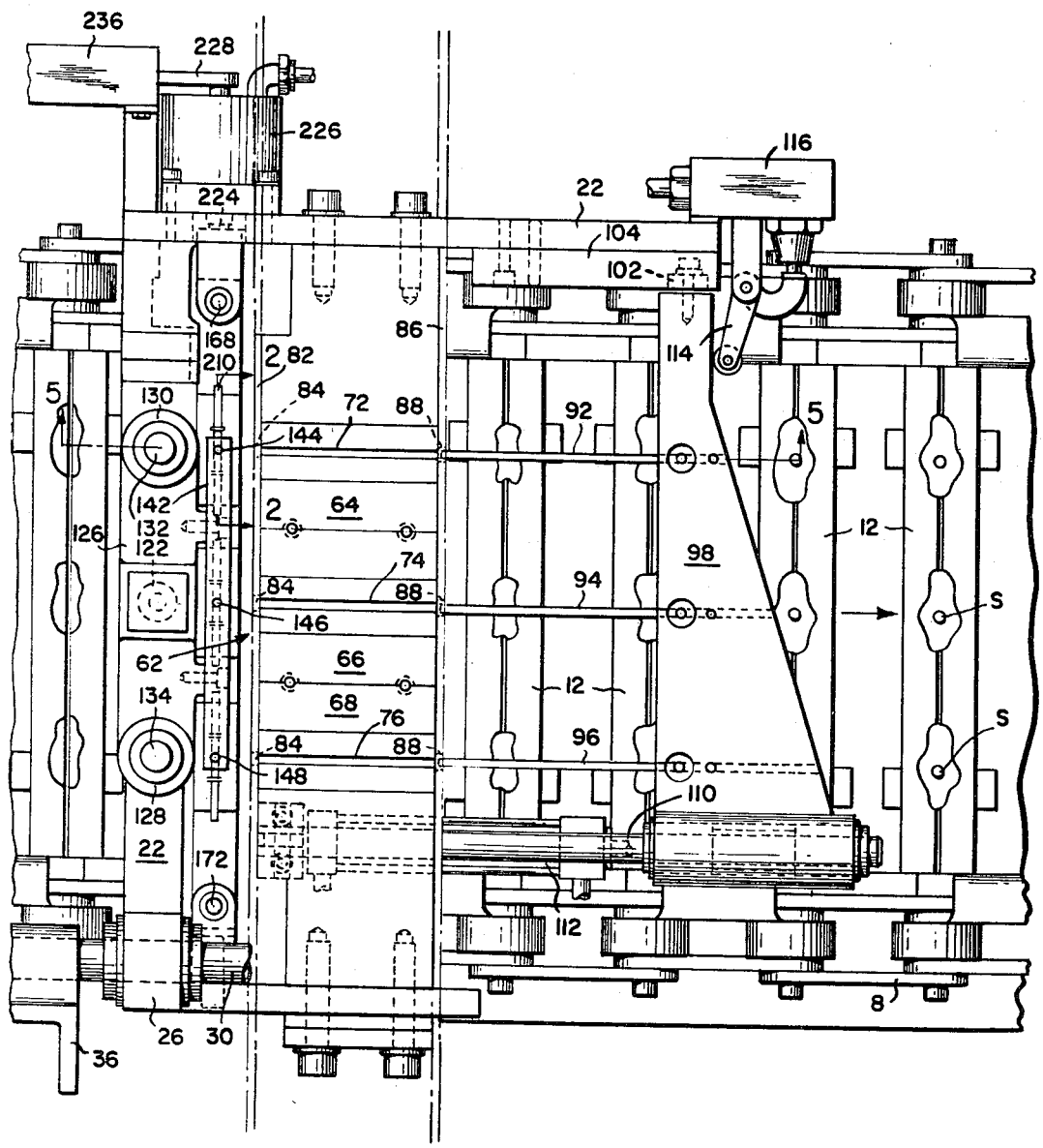
Figure 4:
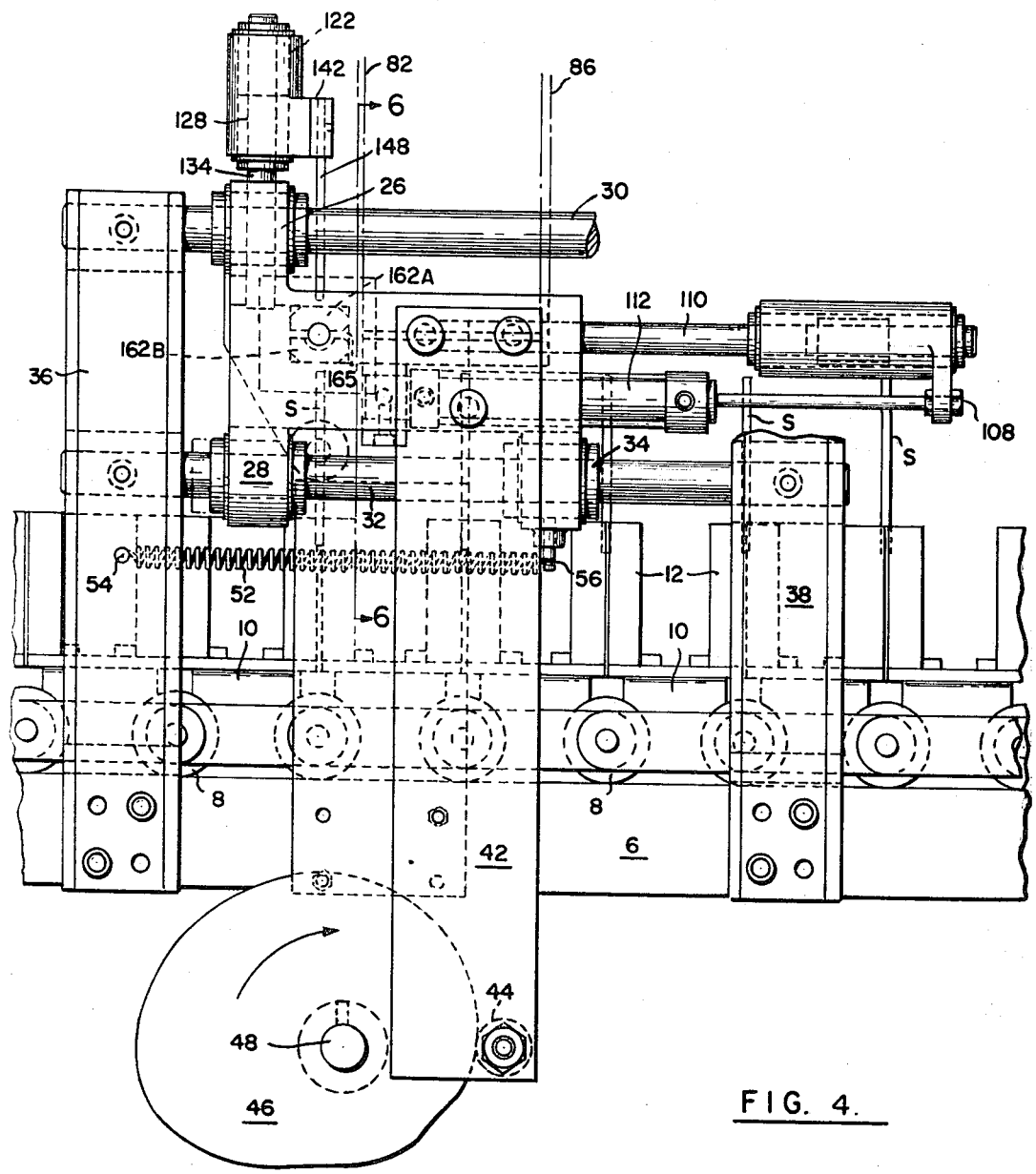
Figure 5:
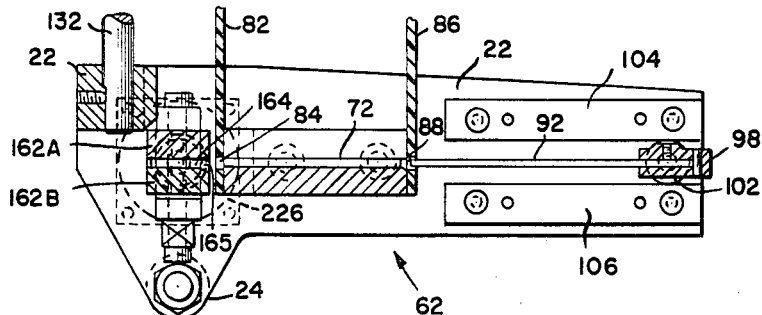
Figure 6:
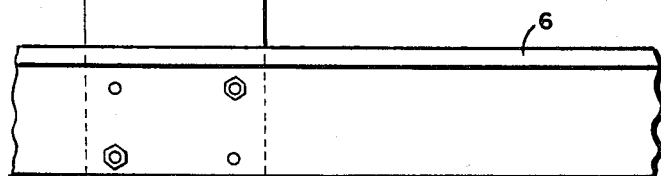
Figure 10:
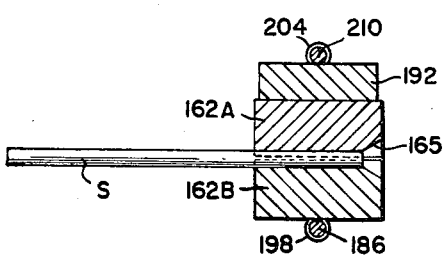
Figure 8:
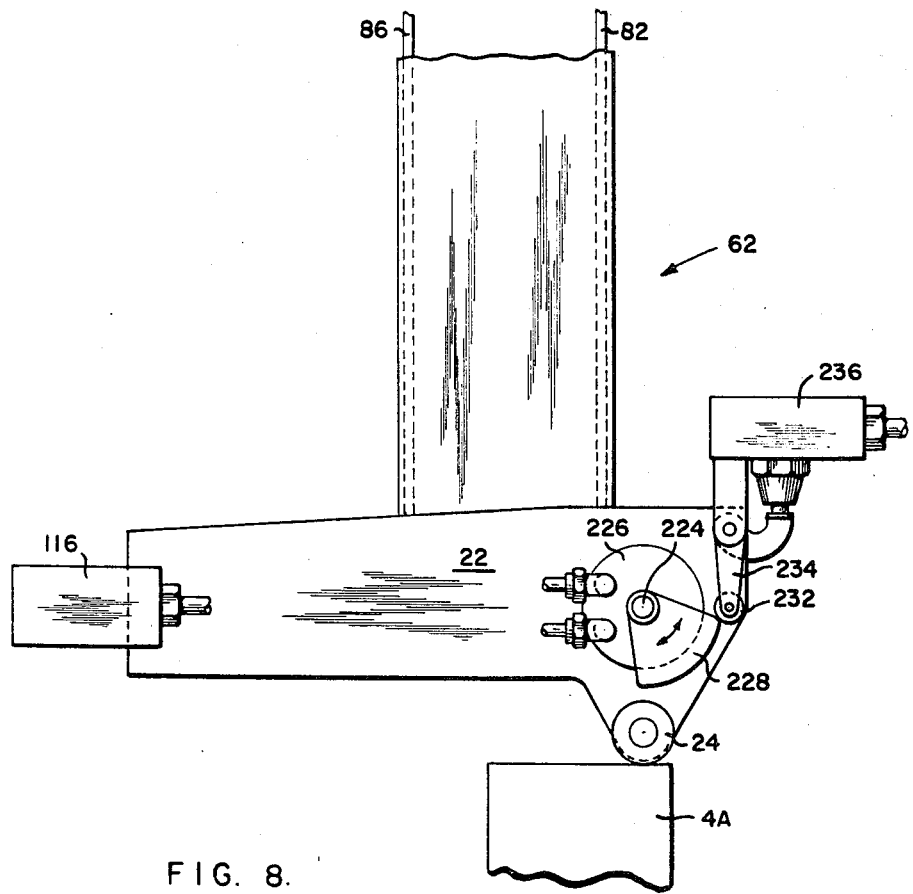
Figure 7:
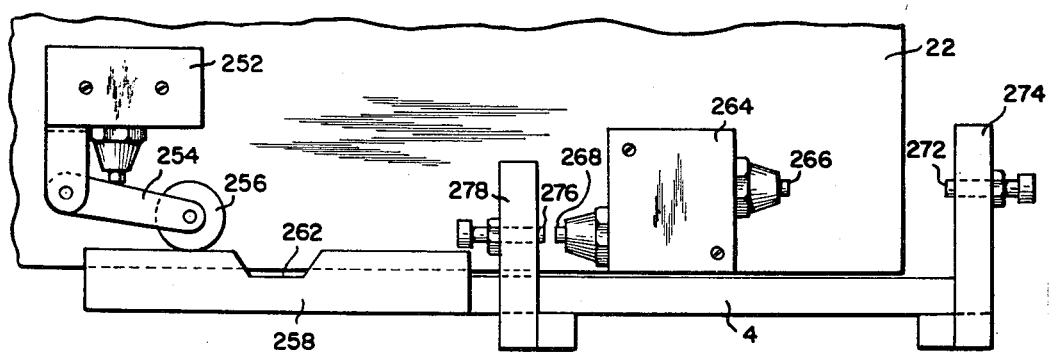
Figure 9:
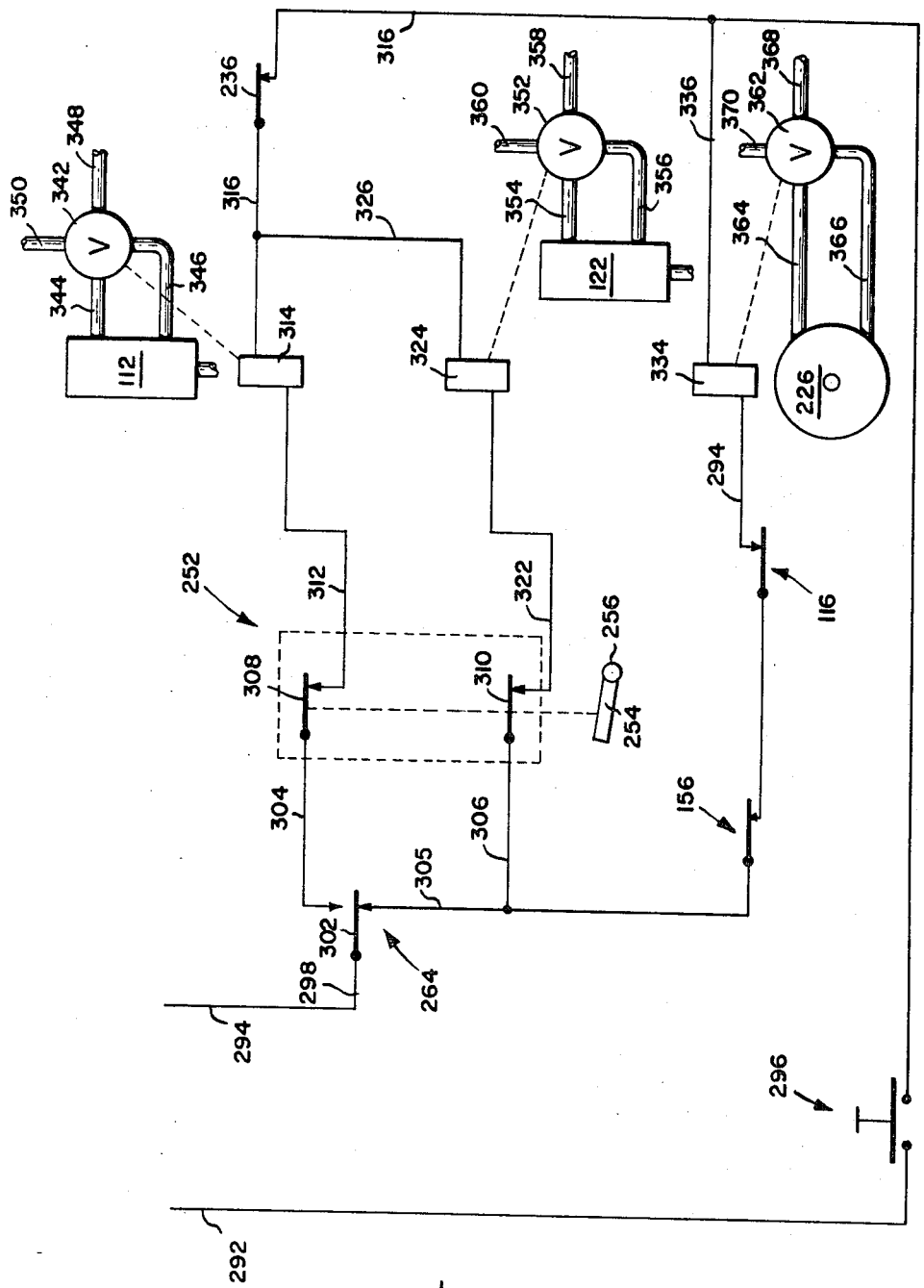

In the drawings:

FIGURE 1 is a vertical section through a candy mold conveyor showing the rear of the stick inserting mechanism of the invention, FIGURE 2 is a vertical section taken on the plane indicated by the lines 3—3 in FIGURE 1, FIGURE 3 is a plan view of the mechanism of FIGURE 1, FIGURE 4 is a side elevation of the mechanism of FIGURE 1, FIGURE 5 is a sectional view, partially broken away, taken on the plane indicated by the lines 5—5 in FIGURE 3, FIGURE 6 is a vertical section, partially broken away, taken on the plane indicated by the lines 6—6 in FIGURE 4, FIGURE 7 is a side elevation of mechanism of FIGURE 1, partially broken away, showing control elements, FIGURE 8 is a side elevation of the mechanism of FIGURE 1, partially broken away, showing control elements, FIGURE 9 is a schematic wiring diagram; and FIGURE 10 is a vertical section through rotatable stick holding means of the stick inserting mechanism showing a stick inserted therein.

Referring to FIGURE 1, a conventional conveyor 2 has a frame 4 carrying tracks 6 on which conveyor chains 8 are supported. Brackets 10 secured to conveyor chains 8 carry molds 12 which have cavities 14 containing, for example, candy in a soft unhardened state. This structure is well known to the art as seen, for example, in Patent 3,221,673 the disclosure of which with respect to the molds and the conveyor carrying the molds is incorporated herewith.

A stick inserter mechanism 20, in accordance with the invention, has a frame 22 which carries a roller 24 which rides on the top of portion 4a of frame 4. Frame 22 is provided with sleeve members 26 and 28 (FIGURE 4) which ride on rods 30 and 32 respectively. A third sleeve member 34 also rides on rod 32. Rods 30 and 32 are supported by brackets 36 and 38 which are secured to frame 4.

A bracket 42 (FIGURE 4) secured to frame 22 carries a cam follower roller 44 adapted to engage cam 46 secured to shaft 48 which rotates in timed relation with conveyor 2. Extension spring 52 secured to bracket 36 at 54 and to frame 22 at 56 urges cam follower roller 44 against cam 46.

A stick reservoir 62 secured to frame 22 above the level of mold 12 has in its lower end three troughs 64, 66 and 68 (FIGURE 6) with the lower ends 72, 74 and 76 respectively being substantially semicircular in cross-section with a radius slightly larger than the radius of the upper end of the range of radii of the sticks employed. Adjacent each lower portion 72, 74 and 76 in the rear hopper wall 82 is an opening 84 (FIGURE 5). Similarly in the front hopper wall 86 adjacent each lower portion of 72, 74 and 76 is an opening 88.

Pusher rods 92, 94 and 96 (FIGURE 3) are secured to member 98 which carries a guide roller 102 which moves between guide plates 104 and 106 secured to frame 22 (FIGURE 5). Member 98 is also connected at 108 (FIGURE 4) to a rod 110 of air ram 112. In the fully retracted position of member 98, it engages bell crank lever 114 to actuate switch 116 (FIGURE 3).

As best seen in FIGURE 1, an air ram 122 has its rod 123 anchored to frame 22 by nuts 124 and 125. Ram 122 is secured to a crosshead 126 provided with sleeve portions 128 and 130 slideably mounted on rods 132 and 134 which are respectively anchored to frame 22 as indicated at 136 and 138. As seen in FIGURE 3 a bar 142 is fixedly secured to crosshead 126 and has fixedly secured thereto pusher rods 144, 146 and 148 (see also FIGURE 3). A bracket 152 (FIGURE 1) secured to sleeve portion 130 of crosshead 126 engages lever 154 to actuate switch 156 when crosshead 126 is in the retracted or upper position.

A split bar 162 (FIGURE 1) is mounted below bar 142 and has openings 164 with outwardly flared entrances 165 which can be aligned respectively with either pusher bars 92, 94 and 96 or pusher bars 144, 146 and 148. Split bar 162 has a portion 162a which is mounted for movement on a pin 168 in cap shaped member 170 and a pin 172 secured to cap-shaped member 174. Split bar 162 also has a portion 162b which is mounted for free movement on pin 178 in member 170 and pin 180 in member 174. Portions 162a and 162b are urged together by a plurality of holding devices 184 (FIGURE 2). Each holding device 184 comprises a bar 186 fixedly secured at a right angle to bars 188 and 190 which pass freely through portions 162b and 162a and freely through a bar 192 which bears against portion 162a. A pair of extension coil springs 194 and 196 have their respective ends 198 and 202 secured to bar 186 and pass freely through portion 162b and 162a and bar 192 and have their other ends 204 and 206 respectively secured to a bar 210.

Member 174 is fixedly secured to a shaft 222 which is mounted for rotation in frame 22. Member 170 is fixedly secured to rotatable shaft 224 which is connected to a short stroke rotary air motor 226. Shaft 224 is connected to a cam segment 228 (FIGURE 8) which engages a roller 232 on bell crank lever 234 to actuate switch 236 when shaft 224 is rotated counterclockwise as viewed in FIGURE 8.

Referring now to FIGURE 7, a switch 252 secured to frame 22 is controlled by a switch arm 254 having a cam follower roller 256 which engages a cam 258 secured to frame 4. Cam 258 has a slotted portion 262.

A switch 264 is also secured to frame 22 and is provided with operating plungers 266 and 268 which are respectively actuated by a stop member 272 threadably secured to bracket 274 and a stop member 276 threadably secured to a bracket member 278. Bracket members 274 and 278 are secured to frame 4.

Referring now to the wiring diagram in FIGURE 9, power lines 292 and 294 are provided with line 292 being connected to an on-off switch 296. Line 294 is connected to a line 298 which in turn is connected to switch arm 302 of switch 264. Arm 302 is adapted to connect line 298 either to line 304 or line 305 which is connected to line 306. Lines 304 and 306 are connected respectively to switch arms 308 and 310 of switch 252. Arm 308 is adapted to connect line 304 to line 312 which is connected to a solenoid 314 which in turn is connected to line 316 containing switch 236 and connected to switch 296. Arm 310 is adapted to connect line 306 to line 322 which is connected to solenoid 324 which in turn is connected by line 326 to line 316. Line 305 contains switches 116 and 156 and is connected to a solenoid 334 which in turn is connected by line 336 to line 316.

Solenoid 314 controls valve 342 which in turn controls air ram 112. Valve 342 is connected to one end of ram 112 by line 344 and to the other end by line 346 and is provided with an air supply line 348 and a line 350 exhausting to the atmosphere.

Solenoid 324 controls valve 352 which in turn controls air ram 122. Valve 352 is connected to one end of ram 122 by a line 354 and to the other end by a line 356 and is provided with an air supply line 358 and a line 360 venting to the atmosphere.

Solenoid 334 controls a valve 362 which in turn controls air motor 226. Valve 362 is connected to one side of motor 226 by a line 364 and to the other side by a line 366 and is connected to an air supply 368 and a line 370 which vents to the atmosphere.

OPERATION

As the carriage 20 reaches the fully forward position (extreme right as viewed in FIGURE 4) plunger 266 of switch 264 is moved inwardly by contact with member 272 (FIGURE 7) to cause switch arm 302 (FIGURE 9) to break contact with line 305 and contact line 304 thus causing solenoid 334 to be deenergized and operate valve 362 to cause motor 226 to operate counterclockwise as viewed in FIGURE 8 to rotate split bar 162 90° to position the openings 164 in a horizontal position for the reception of sticks. This also causes sector 228 to engage cam follower 232 causing switch 236 to close.

As the stick inserting mechanism 20 moves to the rear under the urging of spring 52, cam follower roller 256 drops into slot 262 (FIGURE 7) causing switch arm 308 to connect lines 304 and 312 to energize solenoid 314 which actuates valve 342 to cause ram 112 to move member 98 and pusher rods 92, 94 and 96 toward the rear to pick up sticks in reservoir 62 and move them into openings 164 in split bar 162. The holding members 184 provide for accommodating and firmly holding sticks of various diameters by bar 162 and prevents any jamming or breakage. As member 98 moves forwardly, it releases lever 114 which causes switch 116 to open to positively insure that motor 226 would not be operated to rotate bar 162 until member 98 is again fully retracted.

As the stick inserter mechanism 20 moves further to the rear, cam follower roller 256 moves upwardly out slot 262 causing switch on 308 to break the connection between lines 304 and 312 thus deenergizing solenoid 314 and actuating valve 342 to reverse ram 102 to cause member 98 and pusher rods 92, 94 and 96 to fully retract to the position shown in FIGURE 3. As the mechanism 20 reaches its rearmost position, plunger 268 of switch 264 is carried into contact with member 276 causing arm 302 to shift from line 304 to line 305 causing the energizing of solenoid 334 and the actuation of valve 362 to cause motor 226 to rotate in a clockwise direction as viewed in FIGURE 4 to place the openings 164 and the contained sticks in a vertical position. At the same time sector 228 releases cam follower roller 232 to cause switch 236 to open to prevent positively the operation of air ram 112.

As the mechanism 20 moves forwardly by the action engagement of cam 46 on cam follower roller 44 it is accelerated to and then maintains the speed at which molds 12 are advancing with the openings 164 being directly over the cavities 14 in one of the molds 12. When cam follower roller 256 drops into slot 262, switch arm 310 connects lines 306 and 322 to energize solenoid 324 which actuates valve 352 to cause ram 122 to move downwardly in turn causing pusher rods 144, 146 and 148 to enter the respective openings 164 and urge the sticks S contained therein downwardly into mold cavities 14. Further, forward movement of mechanism 20 causes cam follower roller 256 to move out of slot 262 and switch arm 310 to break the connection between lines 306 and 322 thus deenergizing solenoid 324 and actuating valve 352 to cause ram 122 to move upwardly to its original position shown in FIGURE 1. When ram 122 is in the upward position, bracket 152 in contact with lever 154 causes switch 156 to be in the closed position. As the ram 122 moves downwardly, switch 156 opens which opens the circuit to solenoid 334 insuring that split bar 162 cannot be rotated.

This cycle is repeated in order to insert a stick in each mold cavity.

It will be understood that the above described preferred embodiment is by way of illustration and is not intended to be limiting.

I claim:

1. A stick inserting mechanism for inserting a stick into a moving mold comprising:
    a frame mounted for reciprocation along the line of movement of the mold,
    means to reciprocate the frame including means to advance the frame in the direction of the movement of the molds at the same speed as the molds during at least a portion of said advance,
    rotatable stick holding means mounted on the frame above the molds having a passage for the reception of a stick,
    means to rotate the stick holding means between a position where the passage is horizontal and a position where the passage is vertical,
    a stick reservoir for holding a supply of sticks in a horizontal position,
    means to transfer a horizontal stick from the reservoir to the stick holding means when the passage is in the horizontal position,
    means to advance a stick through the passage and into the mold when the passage is in the vertical position.

2. A mechanism in accordance with claim 1 in which the reservoir has a lower portion receiving a stick aligned with the transfer means.

3. A mechanism in accordance with claim 1 in which the transfer means is a pusher rod.

4. A mechanism in accordance with claim 1 in which the stick holding means comprises a pair of bars and resilient means to bias the bars together.

References Cited

UNITED STATES PATENTS

| 2,591,033 | 4/1952 | Washburn | 107—8 |
| 2,929,340 | 3/1960 | Töpfer | 107—8 |
| 2,953,105 | 9/1960 | Rasmusson | 107—8 |
| 3,169,494 | 2/1965 | Jernigan et al. | 107—8 |
| 3,213,486 | 10/1965 | Blake | 17—1 |
| 3,221,673 | 12/1965 | Shelly | 107—8 |

ROBERT W. JENKINS, *Primary Examiner.*

A. O. HENDERSON, *Assistant Examiner.*